Figure 1:
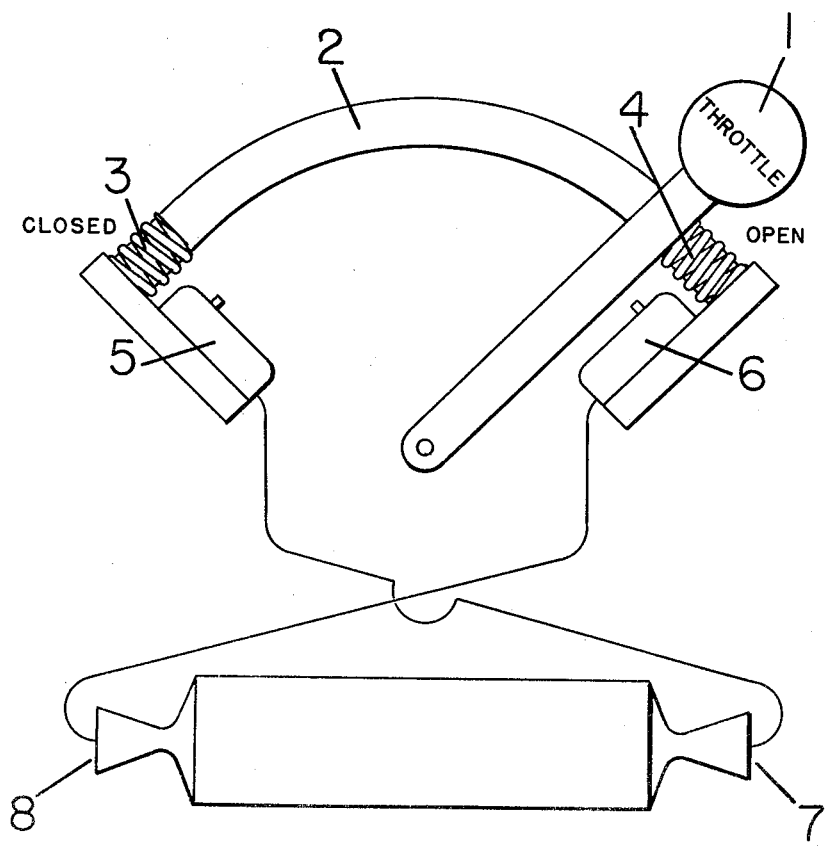

Patented Nov. 14, 1950

2,529,508

UNITED STATES PATENT OFFICE 2,529,508

COMBINED THROTTLE LEVER AND ROCKET FIRING MEANS FOR ACCELERATION OR DECELERATION OF AIRCRAFT

Gilmour Craig MacDonald, Ames, Iowa

Application April 1, 1947, Serial No. 738,603

6 Claims. (Cl. 244—58)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to aircraft safety devices, and more particularly to safety control means for actuating rocket thrust devices of the type that permit manual choice of either acceleration or deceleration of the aircraft in an emergency.

It is an object of this invention to utilize the instinctive reaction of the aircraft pilot in effecting emergency actuation of rocket thrust devices of the type permitting either acceleration or deceleration of the aircraft (hereinafter referred to as two-way rockets).

It is a further object of this invention to provide a two-way rocket actuating means that does not require the pilot to look down into the cockpit and select the proper switch at a time when all his attention is required elsewhere. It has been repeatedly shown that the cockpit of a modern aircraft offers the pilot all too many opportunities to flip the wrong switch. Literally thousands of expensive aircraft have been badly damaged because the pilots, thinking that they were operating the control switch to raise the flaps for landing, have inadvertently raised the landing gear instead. Such mistakes, while expensive, have caused relatively few serious accidents. It is obvious, however, that should the pilot of an aircraft equipped with two-way rockets fire the rockets the wrong way when trying desperately to clear an obstacle ahead, a major crash would occur. Similarly, if the pilot making a forced landing in a too small field inadvertently fired the rockets to give an accelerating thrust, a serious accident would result.

In preferred form for use with powered aircraft, the actuator can be built into or attached to the throttle assembly, since that is the control that the pilot will instinctively operate in an emergency involving increase or decrease of speed. When in need of more engine power he will instinctively push the throttle forward to the limit, and when trying to make a steep approach or to land in the minimum distance, he will pull the throttle clear back.

Obviously when the pilot is in trouble, he cannot take time to look down into the cockpit and select either a master safety switch or an actuating switch, but his hand can unerringly find the throttle without requiring conscious attention.

Other objects and advantages of this invention will be apparent during the course of the following description, reference being made to the attached drawings wherein the single figure is a schematic drawing of a two-way rocket employing the subject actuator invention in preferred form.

Normally, the pilot of the aircraft will effect control of the power plant by means of the throttle 1, which slides along sector 2 between the buffer springs 3, 4 which determine the idling and full throttle positions respectively.

In an emergency involving need for acceleration, the pilot will instinctively use extra effort in moving the throttle 1 forward to the "open" or full throttle position, in an effort to get maximum power from his engine, and this extra force will compress buffer spring 4, permitting throttle 1 to actuate firing switch 6 which opens the rearward nozzle 8 of the emergency thrust unit and ignites the rocket, producing acceleration of the aircraft.

Similarly when emergency deceleration is required, the pilot in forcibly closing the throttle 1 will compress buffer spring 3, actuating firing switch 5 which produces a rearward or decelerating thrust through nozzle 7.

It will be understood that the scope of this invention is not limited to the exemplary structure described, but is limited only by the claims.

I claim:

1. A device for actuating emergency rocket thrust units of the type permitting either acceleration or deceleration of aircraft, comprising in combination, a throttle for control of the normal propulsion mechanism, emergency rocket thrust units secured to said aircraft, actuators for said rocket units, and control means between said throttle and said actuators, said means being effective to cause said actuators to function when the said throttle is shifted beyond the range of movement used in controlling the said normal propulsion mechanism.

2. An aircraft safety device comprising, in combination, aircraft primary propulsion means including a throttle-control lever, secondary propulsion means including emergency rocket thrust units secured to the aircraft and of a type permitting either acceleration or deceleration of the aircraft, and rocket-firing means operatively associated with the rocket thrust units and the throttle-control lever to be actuated by the said lever for firing the rocket thrust units when the throttle control lever is shifted beyond either limit of the normal range of movement used in controlling the primary propulsion means.

3. A safety control device for aircraft operation comprising primary propulsion means for the aircraft including a throttle-control lever movable beyond the idling and full throttle positions respectively, rocket means secured to the aircraft for emergency propulsion purposes and operable for accelerating or decelerating the aircraft, and rocket-firing means including actuators operatively positioned in the path of movement of the throttle control lever to be contacted and operated thereby for firing the rocket means to accelerate the aircraft when the lever is positioned beyond its full throttle position and to decelerate the aircraft when the lever is positioned beyond its idling position.

4. A safety control device for aircraft operation comprising primary propulsion means for the aircraft including a throttle-control lever movable beyond idling and full throttle positions respectively, means operatively associated with the throttle-control lever for determining the idling and full throttle positions of the lever and for preventing movement of the lever beyond the said positions in the absence of an energizing force on the lever in excess of that normally required for so positioning the lever in controlling the operation of the primary propulsion means, rocket means secured to the aircraft for emergency propulsion purposes and operable for accelerating or decelerating the aircraft, and rocket-firing means operatively connected with the throttle control lever to be operated thereby for firing the rocket means to accelerate the aircraft when the throttle control-lever is moved beyond its full throttle position and to decelerate the aircraft when the said lever is moved beyond the idling position.

5. An aircraft safety device comprising the combination with an aircraft provided with primary propulsion means of a type having a throttle-control lever and secondary propulsion means of the two-way rocket motor type secured to the aircraft to deliver thrust in the fore and aft direction of the latter for accelerating or decelerating the aircraft, of rocket firing means associated with the two-way rocket motor and operatively connected with the throttle-control lever to be actuated thereby for firing the rocket motor to accelerate the aircraft when the control lever is moved in one direction beyond the full throttle position and to decelerate the aircraft when the control lever is moved in the opposite direction beyond the idling position.

6. Safety control means for vehicle operation comprising primary control means for controlling the normal operation of the vehicle and including a movable control lever—a guide along which the lever is movable—and buffer springs associated with the guide and on relatively opposite sides of the lever to yieldably restrict the lever to a predetermined range of movement in the operation of the primary control means, rocket type impulse-producing means associated with the vehicle and operable for effecting changes in the position or operation of the vehicle to meet emergencies, and a normally open switch operatively associated with the guide near each end of but outside the predetermined normal range of movement of the control lever to be contacted and closed by the lever when the said lever is shifted beyond the corresponding end of its normal range of movement, each switch being operatively connected with the impulse-producing means to energize the latter upon closure of the switch by the lever to produce a thrust augmenting the operational effect on the vehicle resulting from the instant position of the control lever.

GILMOUR CRAIG MacDONALD.

REFERENCES CITED

The following references are of record in the file of this patent:

UNITED STATES PATENTS

| Number | Name | Date |
| --- | --- | --- |
| 1,374,787 | Walker | Apr. 12, 1921 |
| 2,071,063 | De Florez | Feb. 16, 1937 |
| 2,395,435 | Thompson | Feb. 26, 1946 |

FOREIGN PATENTS

| Number | Country | Date |
| --- | --- | --- |
| 512,092 | Germany | Nov. 7, 1930 |